(12) United States Patent
Ballet et al.

(10) Patent No.: US 8,079,702 B2
(45) Date of Patent: Dec. 20, 2011

(54) OPTICAL COMPONENT WITH CELLS

(75) Inventors: Jerome Ballet, Charenton le Pont (FR); Christian Bovet, Charenton le Pont (FR)

(73) Assignee: Essillor International (Compangie Generale d'optique), Charenton le Pont (FR)

(*) Notice: Subject to any disclaimer, the term of this patent is extended or adjusted under 35 U.S.C. 154(b) by 46 days.

(21) Appl. No.: 11/996,097

(22) PCT Filed: Jul. 13, 2006

(86) PCT No.: PCT/IB2006/002386
§ 371 (c)(1),
(2), (4) Date: Jan. 18, 2008

(87) PCT Pub. No.: WO2007/023383
PCT Pub. Date: Mar. 1, 2007

(65) Prior Publication Data
US 2008/0225402 A1 Sep. 18, 2008

(30) Foreign Application Priority Data
Jul. 20, 2005 (FR) .................................. 05 07718

(51) Int. Cl.
*G02C 7/02* (2006.01)
*G02C 7/04* (2006.01)
*G02C 13/00* (2006.01)
*G02B 13/00* (2006.01)
*G02B 3/00* (2006.01)

(52) U.S. Cl. .................... 351/159; 351/160 R; 351/177; 351/178; 359/642; 359/724

(58) Field of Classification Search .................... 351/41, 351/44, 159, 163–166, 172, 177, 160 R, 178; 156/102; 359/721, 618–622, 294–296, 237, 359/642, 724; 349/13
See application file for complete search history.

(56) References Cited

U.S. PATENT DOCUMENTS 2,196,066 A 4/1940 Feinbloom
2,511,329 A 6/1950 Craig
(Continued)

FOREIGN PATENT DOCUMENTS
AU 779628 2/2005
(Continued)

OTHER PUBLICATIONS

Lide, David R. CRC Handbook of Chemistry and Physics, 89th Edition (CRC Handbook of Chemistry & Physics). Null: CRC, 2008 pp. 10-1 through 10-92 (herein known as CRC Handbook).*

(Continued)

*Primary Examiner* — Ricky Mack
*Assistant Examiner* — Zachary Wilkes
(74) *Attorney, Agent, or Firm* — Occhiuti Rohlicek & Tsao LLP

(57) ABSTRACT

An optical component (10) comprises a transparent set of cells (15; 25) juxtaposed in parallel to a surface of the component. Each cell is hermetically sealed and contains a substance with an optical property. The set of cells comprises cells of several sizes. The size of the cells can be varied between various locations of the surface of the component (10), for making it possible to cut out the component without altering its optical properties. Furthermore, the variation in size of the cells serves to prevent diffraction or scattering from being visible in certain zones of the component.

28 Claims, 2 Drawing Sheets

U.S. PATENT DOCUMENTS

| | | | |
|---|---|---|---|
| 3,460,960 A | | 8/1969 | Francel et al. |
| 3,532,038 A | | 10/1970 | Rottmann et al. |
| 3,628,854 A | * | 12/1971 | Jampolsky ............... 351/175 |
| 3,978,580 A | | 9/1976 | Leupp et al. |
| 4,150,878 A | | 4/1979 | Barzilai et al. |
| 4,268,132 A | | 5/1981 | Neefe |
| 4,601,545 A | * | 7/1986 | Kern ............................. 349/200 |
| 4,621,912 A | | 11/1986 | Meyer |
| 4,720,173 A | | 1/1988 | Okada et al. |
| 4,791,417 A | | 12/1988 | Bobak |
| 4,994,664 A | | 2/1991 | Veldkamp |
| 5,017,000 A | | 5/1991 | Cohen |
| 5,044,742 A | | 9/1991 | Cohen |
| 5,067,795 A | | 11/1991 | Senatore |
| 5,139,707 A | | 8/1992 | Guglielmetti et al. |
| 5,233,038 A | | 8/1993 | Guglielmetti et al. |
| 5,359,444 A | | 10/1994 | Piosenka et al. |
| 5,529,725 A | | 6/1996 | Guglielmetti et al. |
| 5,576,870 A | | 11/1996 | Ohmae |
| 5,585,968 A | | 12/1996 | Guhman |
| 5,604,280 A | | 2/1997 | Pozzo et al. |
| 5,699,142 A | | 12/1997 | Lee et al. |
| 5,733,077 A | | 3/1998 | MacIntosh |
| 5,763,054 A | | 6/1998 | Samec et al. |
| 5,764,333 A | | 6/1998 | Somsel |
| 5,774,273 A | | 6/1998 | Bornhorst |
| 5,805,263 A | * | 9/1998 | Reymondet et al. .......... 351/159 |
| 5,807,906 A | | 9/1998 | Bonvallot et al. |
| 5,812,235 A | * | 9/1998 | Seidner et al. ............ 351/160 R |
| 5,905,561 A | | 5/1999 | Lee et al. |
| 5,914,802 A | | 6/1999 | Stappaerts et al. |
| 6,019,914 A | | 2/2000 | Lokshin et al. |
| 6,118,510 A | | 9/2000 | Bradshaw et al. |
| 6,199,986 B1 | | 3/2001 | Williams et al. |
| 6,259,501 B1 | | 7/2001 | Yaniv |
| 6,274,288 B1 | | 8/2001 | Kewitsch et al. |
| 6,281,366 B1 | * | 8/2001 | Frigoli et al. .................... 549/59 |
| 6,301,051 B1 | | 10/2001 | Sankur |
| 6,307,243 B1 | | 10/2001 | Rhodes |
| 6,309,803 B1 | | 10/2001 | Coudray et al. |
| 6,327,072 B1 | | 12/2001 | Comiskey et al. |
| 6,449,099 B2 | | 9/2002 | Fujimoto et al. |
| 6,485,599 B1 | | 11/2002 | Glowina et al. |
| 6,577,434 B2 | | 6/2003 | Hamada |
| 6,597,340 B1 | | 7/2003 | Kawai |
| 6,707,516 B1 | | 3/2004 | Johnson et al. |
| 6,712,466 B2 | * | 3/2004 | Dreher ........................... 351/161 |
| 6,871,951 B2 | | 3/2005 | Blum et al. |
| 6,934,088 B2 | | 8/2005 | Lai et al. |
| 6,963,435 B2 | | 11/2005 | Mallya et al. |
| 6,987,605 B2 | | 1/2006 | Liang et al. |
| 7,036,929 B1 | | 5/2006 | Harvey |
| 7,144,529 B1 | | 12/2006 | Mercier |
| 7,227,692 B2 | | 6/2007 | Li et al. |
| 7,289,260 B2 | * | 10/2007 | Kaufman et al. ............. 359/319 |
| 7,404,637 B2 | | 7/2008 | Miller et al. |
| 7,533,453 B2 | | 5/2009 | Yancy |
| 7,715,107 B2 | | 5/2010 | Loopstra et al. |
| 2002/0008898 A1 | | 1/2002 | Katase |
| 2002/0016629 A1 | | 2/2002 | Sandstedt et al. |
| 2002/0080464 A1 | | 6/2002 | Bruns |
| 2002/0114054 A1 | | 8/2002 | Rietjens |
| 2002/0140899 A1 | | 10/2002 | Blum et al. |
| 2002/0145797 A1 | | 10/2002 | Sales et al. |
| 2002/0167638 A1 | | 11/2002 | Byun et al. |
| 2002/0176963 A1 | | 11/2002 | Chen et al. |
| 2003/0003295 A1 | | 1/2003 | Dreher et al. |
| 2003/0021005 A1 | | 1/2003 | Liang et al. |
| 2003/0035199 A1 | | 2/2003 | Liang et al. |
| 2003/0081172 A1 | | 5/2003 | Dreher |
| 2003/0085906 A1 | | 5/2003 | Elliott et al. |
| 2003/0143391 A1 | | 7/2003 | Lai |
| 2003/0147046 A1 | | 8/2003 | Shadduck |
| 2003/0152849 A1 | | 8/2003 | Chan-Park et al. |
| 2003/0174385 A1 | | 9/2003 | Liang et al. |
| 2003/0206260 A1 | | 11/2003 | Kobayashi et al. |
| 2004/0008319 A1 | | 1/2004 | Lai et al. |
| 2004/0027327 A1 | | 2/2004 | LeCain et al. |
| 2004/0114111 A1 | | 6/2004 | Watanabe |
| 2004/0120667 A1 | | 6/2004 | Aylward et al. |
| 2004/0125247 A1 | | 7/2004 | Seshan et al. |
| 2004/0125337 A1 | | 7/2004 | Boulineau et al. |
| 2004/0165252 A1 | | 8/2004 | Liang et al. |
| 2004/0169932 A1 | | 9/2004 | Esch et al. |
| 2004/0190115 A1 | | 9/2004 | Liang et al. |
| 2004/0233381 A1 | * | 11/2004 | Kim et al. ..................... 351/110 |
| 2006/0006336 A1 | | 1/2006 | Cano et al. |
| 2006/0087614 A1 | | 4/2006 | Shadduck |
| 2006/0279848 A1 | | 12/2006 | Kuiper et al. |
| 2007/0152560 A1 | | 7/2007 | Naito et al. |
| 2008/0068723 A1 | | 3/2008 | Jethmalani et al. |
| 2008/0212018 A1 | | 9/2008 | Ballet et al. |
| 2008/0314499 A1 | | 12/2008 | Begon et al. |

FOREIGN PATENT DOCUMENTS

| | | | |
|---|---|---|---|
| CA | | 2340672 | 12/2000 |
| DE | | 19714434 | 10/1998 |
| EP | | 728572 | 8/1996 |
| EP | | 1225458 | 7/2002 |
| EP | | 1308770 | 5/2003 |
| FR | | 2561005 | 9/1985 |
| FR | | 2718447 | 10/1995 |
| FR | | 2872589 | 1/2006 |
| WO | | 00/77570 | 12/2000 |
| WO | | 02/01281 | 1/2002 |
| WO | | 02/065215 | 8/2002 |
| WO | | 03/012542 | 2/2003 |
| WO | | 03/077012 | 9/2003 |
| WO | WO | 03/102673 | 12/2003 |
| WO | | 2004/015481 | 2/2004 |
| WO | | 2004/034095 | 4/2004 |
| WO | | 2004/051354 | 6/2004 |
| WO | WO 2005033782 A2 | * | 4/2005 |
| WO | | 2006/013250 | 2/2006 |
| WO | | 2006/050366 | 5/2006 |
| WO | | 2006/067309 | 6/2006 |
| WO | | 2007/010414 | 1/2007 |
| WO | | 2007/023383 | 3/2007 |
| WO | | 2007/144308 | 12/2007 |

OTHER PUBLICATIONS

Kaufman US Provisional 60/507940 Drawing Sheets 4, 5.*
Cognard, Philippe. "Colles et adhesifs pour ernballages, Generalities," 18 pages (English Summary Provided), Nov. 10, 2001.
Fowles, Grant R. Introduction to Modern Optics. New York: Dover Publications, 1989. Print. pp. 138-139.
Hecht, Eugene, "Optics, 4th Edition" 2002 Addison Wesley, p. 428 (XP002465206) (chapter 10 from 2nd edition provided).
J-P. Perez, Optique: Fondements et Applications [Optics: Basics and Applications] 7th edition, published by Dunod, Oct. 2004, p. 262.

* cited by examiner

OPTICAL COMPONENT WITH CELLS

CROSS-REFERENCE TO RELATED APPLICATIONS

This application is the National Stage of International Application No. PCT/IB2006/002386, filed on Jul. 13, 2006, which claims the priority of French Application No. 0507718, filed on Jul. 20, 2005. The contents of both applications are hereby incorporated by reference in their entirety.

The present invention relates to an optical component which can be used, in particular, for fabricating a transparent optical element such as an ophthalmic lens.

The fabrication of an ophthalmic lens from an optical component comprising a set of cells juxtaposed in parallel to a surface of the component is known. Each cell is hermetically sealed and contains a substance with an optical property. A proper choice of the substance contained in each cell procures a desired optical function for the ophthalmic lens. Lenses having different optical functions can accordingly be obtained simply by replacing the optical-property substance that is placed in the cells. A large number of lens models can thus be obtained economically from the same optical component model.

Furthermore, the use of hermetically sealed cells serves to prevent the substances contained in neighbouring cells from mixing. An optical function of the lens which is initially obtained by placing different substances in certain cells is accordingly preserved indefinitely, without limiting the useful life of the lens.

A further advantage resulting from the use of hermetically sealed cells is the possibility of using optical-property substances in liquid or gel form. In fact, for certain optical functions, liquid or gelified substances have better properties than solid substances. For example, photochromic liquids and gels have a higher speed of reaction than photochromic solids to variations in luminosity.

Finally, an ophthalmic lens is commonly obtained by cutting out an optical component along a contour that corresponds to a frame selected for a wearer. The use of hermetically sealed cells to contain the optical-property substance(s) of the component serves to prevent a main part of these substances from flowing outside the component. In fact, only optical-property substances contained in the cells located on the cutting contour of the component are lost. By using small sized cells in the zone of the optical component within which the cutting contour is located, the optical function of the component is preserved for the lens. The use of cells hence serves to combine the use of an optical property substance in liquid or gel form, with a method for fabricating ophthalmic lenses by cutting out an initial component.

However, the use of cells has aesthetic and/or optical drawbacks for ophthalmic lenses. In fact, large-sized cells, that is, with one dimension greater than 0.5 mm (millimeter), could cause a visual hindrance to the user. Furthermore, they may be visible and are accordingly unattractive. Cells that are sufficiently small to avoid being individually visible cause iridescence and/or a milky haze. These drawbacks of small-sized cells result from known mechanisms of light diffraction and/or scattering by the set of cells, and particularly by the separating walls arranged between neighbouring cells.

It is therefore one object of the present invention to reduce the optical and/or aesthetic drawbacks of the use of cells in an optical component.

For this purpose, the invention proposes an optical component, comprising at least one transparent set of cells juxtaposed in parallel to a surface of the component, each cell being hermetically sealed and containing an optical-property substance, in which the set of cells comprises cells of several sizes, measured parallel to the component surface.

The use of several cell sizes, according to the invention, serves to optimize the distribution of the cells as a function of their sizes, on the surface of the optical component. Thus, by dimensioning the cells judiciously, the visibility of the cells and diffraction and scattering mechanisms can be avoided or reduced, in the zones of the optical component where a substantial hindrance would result. Such a dimensioning thereby serves to optimize the transparency of an optical element comprising an optical component thus obtained. In the context of the invention, an optical component is said to be transparent when the observation of an image through the said optical component is perceived without a significant loss of contrast, that is, when the formation of an image through the said optical component is obtained without harming the quality of the image.

Furthermore, cells of different sizes can be made in a single step of fabrication of the optical component, so that the production time of the optical component is not lengthened by the use of several cell sizes.

In particular, at least one cell may have a dimension above 0.5 mm up to 5 mm, measured parallel to the component surface. Such a cell does not cause any substantial diffraction or scattering of the light transmitted by the optical component, at least in a plane which contains the dimension of the cell that is higher than this size. In this plane, the cell accordingly has a continuous and highly transparent visual appearance, without iridescence or haze. The optical component, and an element which is obtained from such a component, are accordingly aesthetic. This is particularly advantageous for ophthalmic applications, for which the aesthetic requirement is important.

Some of the cells of the optical component may have one dimension smaller than 200 μm, and preferably smaller than 100 μm measured parallel to the component surface. Such cells are not individually visible to the naked eye, so that they do not substantially degrade the aesthetics of the component, or of an optical element obtained therefrom.

According to a preferred embodiment of the invention, the set of cells comprises at least one large cell in a central zone of the component surface, and small cells located in the component surface between the central zone and one edge of the surface. Thus, the large cell procures perfect aesthetics and optical transmission in the central zone of the optical component. Simultaneously, the small cells serve to adapt and/or vary the optical function in the peripheral zone of the optical component, by changing the optical substance between the neighbouring cells. Furthermore, the component can be cut out along a contour located in the peripheral zone, without altering the optical substance contained in the large cell of the central zone. For example, the large cell of the central zone may have one dimension grater than 0.5 mm, and some of the small cells of the peripheral zone may have one dimension smaller than 200 μm.

Optionally, the size of the cells may vary in a continuous size gradient between the central zone of the surface of the optical component and the edge of this surface. A progressive transition between the dimensions of the cells in the central and peripheral zones of the optical component is thereby obtained, and may contribute to the aesthetics of the component or of an optical element obtained therefrom. This continuous cell size gradient may optionally be different according to the peripheral zones of the optical component.

The size of the cells, in another embodiment of the invention, may also vary in a discontinuous size gradient between the central zone of the optical component and the edge of this surface. This discontinuity between the cell dimensions can help to optimize the optical function of the component or of an optical element obtained therefrom.

Obviously in the context of the invention, all combinations of cell sizes are possible. Thus within a given optical component, it is possible to have at least one zone in which the size of the cells varies in a continuous gradient between the central zone and an edge of this surface, and at least a second zone in which the size of the cells varies in a discontinuous gradient between the central zone and the edge of this surface.

Thanks to the hermetic sealing of each cell, the optical-property substance contained in at least some of these cells may be in liquid or gel form. Such a form of the substance serves to obtain superior optical properties, such as speed of photochromic response. It also serves to obtain certain optical properties easily, such as a particular value of an optical parameter. In fact, a desired value of a parameter can be obtained by mixing several initial liquid or gel substances, which have different respective values for this parameter.

The optical property of the substance contained in each cell may be a property of tinting, photochromism, polarization, or refractive index. In particular, some of the cells of the set may contain substances having respective optical refractive indices which differ between these cells. In this case, cells which contain substances of different refractive index may have variable dimensions. In particular, these dimensions may be adapted according to the estimated ametropy of an eye to be corrected.

An optical component according to the invention can be used for the fabrication of a transparent optical element selected from ophthalmic lenses, lenses for optical instruments, filters, optical sighting lenses, ocular visors, and optics for lighting devices.

The invention also proposes a spectacle lens made by cutting out an optical component as described above. Furthermore, at least one hole can be drilled through the component to fasten the lens to a frame. This drilling is preferably made in a part of the lens where the cells are small sized.

In such a spectacle lens, the optical property of the substances contained in some of the cells and the dimensions of these cells can be adapted to vary along the lens surface according to the estimated ametropy of an eye to be corrected. In particular, a lens which is thus produced may be a progressive lens.

Furthermore, the substance contained in the cells of the lens may be a photochromic substance, preferably in liquid or gel form.

Other features and advantages of the present invention will appear from the description below of non-limiting embodiments, with reference to the drawings appended hereto, in which.

Figure 1:
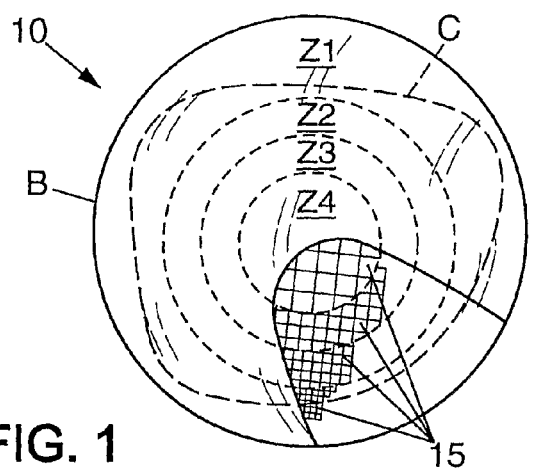
FIG. 1 shows a front view of an optical component according to a first embodiment of the invention.

The optical component 10 shown in FIG. 1 is a blank for spectacle lenses. A spectacle lens comprises an ophthalmic lens. Ophthalmic lens means lenses adapting to a spectacle frame to protect the eye and/or correct the vision, this lens being selected from afocal, unifocal, bifocal, trifocal and progressive lenses.

While ophthalmic optics is a preferred field of application of the invention, it should be understood that this invention is applicable to transparent optical elements of other types, such as, for example, lenses for optical instruments, filters, optical sighting lenses, ocular visors, optics of lighting devices, etc. In the invention, ophthalmic optics includes not only ophthalmic lenses, but also contact lenses and ocular implants.

Figure 2:
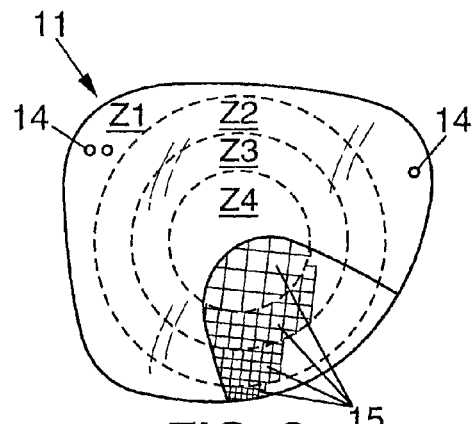
FIG. 2 shows a front view of an optical element obtained from the optical component in FIG. 1.

FIG. 2 shows a spectacle lens 11 obtained by cutting out the blank 10 along a contour C, shown by a broken line in FIG. 1. This contour is basically arbitrary, in so far as it fits into the area of the blank 10. Mass-produced blanks can thus be used to obtain lenses adaptable to a wide variety of spectacle frames. The edge of the lens cut out can be trimmed without any problem, conventionally, to give it a shape adapted to the frame and to the method for fixing the lens to this frame and/or for aesthetic reasons. It is also possible to drill holes 14 therein, for example to receive screws used to fasten it to the frame.

Figure 3:
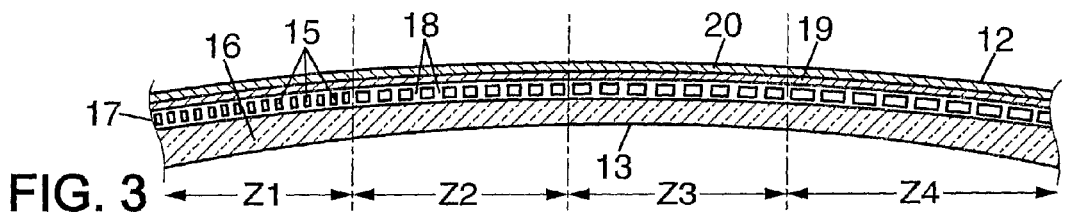
FIG. 3 shows a schematic cross section of the optical component in FIG. 1.

The general shape of the blank 10 may conform to industry standards, with for example a circular peripheral edge B 60 mm in diameter, a front convex face 12, and a back concave face 13 (FIG. 3). Conventional cutting, trimming and drilling tools can thus be used to obtain the lens 11 from the blank 10.

In FIGS. 1 and 2, a partial removal of the surface layers reveals the pixelized structure of the blank 10 and the lens 11. This structure consists of a network of cells or microtanks 15 formed in a layer 17 of the blank 10 (FIG. 3). In these figures, the dimensions of the layer 17 and of the cells 15 have been exaggerated compared to those of the blank 10 and of its substrate 16 to facilitate the reading of the drawing.

According to a first embodiment of the invention, the surface of the blank 10 is divided into several zones, for example, four concentric zones Z1, Z2, Z3 and Z4. The cells 15 have dimensions D, measured parallel to the surface of the blank 10, which vary from one zone to another.

The cells 15 may have dimensions D lower than 20 µm in the outer zone Z1. These dimensions may be about 5 to 10 µm for example. Such cell dimensions make it possible to cut out the blank 10 without losing a significant quantity of optical-property substance contained in the cells 15, when the contour C is in the zone Z1. The optical properties of the blank 10 are only altered by the cutting in a peripheral strip not wider than about 30 µm, inside the contour C. A strip this narrow is invisible. Furthermore, the cells 15 of the zone Z1 are invisible.

In the central zone Z4, the cells 15 preferably have dimensions D above 5 mm. Thus, they generate no perceptible diffraction or scattering, so that they cause no visual hindrance to the wearer and have no impact on the aesthetics of the pair of spectacles. For example, the cells 15 may have dimensions of between 8 mm and 10 mm in the zone Z4.

In the intermediate zones Z2 and Z3, the cells 15 preferably have dimensions D between those of the cells of zones Z1 and Z4. For example, the dimensions D of the cells are about 50 µm in the zone Z2 and 100 µm in the zone Z3.

The cells 15 are separated by walls 18. The walls 18 seal the cells. They have a thickness d of between 0.10 µm and 5 µm, for example, measured parallel to the surface of the blank 10.

The height of the walls 18 may be between 1 μm and 100 μm and preferably between 1 μm and 10 μm, perpendicular to the surface of the blank 10.

Figure 4:
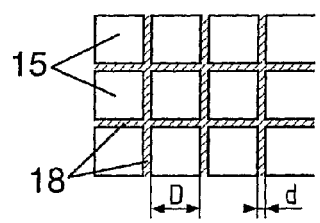
FIGS. 4 and 5 are diagrams showing two types of lattice usable to arrange the cells of an optical component according to the invention.
Figure 5:
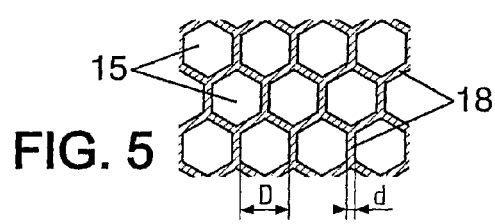

The cells 15 may be arranged in a square lattice (FIG. 4) or a hexagonal lattice (FIG. 5), with walls 18 of thickness d=2 μm, for example. The dimension D of the cells is then the length of the sides of the squares or the hexagons. The hexagonal or honeycomb type of lattice is preferred because it may serve to optimize the mechanical strength of the set of cells. However, in the context of the invention, all possible types of lattice consistent with a crystal geometry are conceivable. Thus rectangular, triangular or octagonal lattices can be made. It is also possible to have a combination of various types of lattice to form the set of cells, while complying with the cell dimensions defined previously. The type of lattice may optionally vary from one zone of the blank 10 to another.

The transparent substrate 16 may be made from glass or various plastics commonly used in ophthalmic optics. Among the plastics used, mention can be made, in an indicative and non-limiting manner, of polycarbonates; polyamides; polyimides; polysulphones; polyethylene terephthalate/polycarbonate copolymers; polyolefins, particularly polynorbornenes; polymers and copolymers of bis(allylcarbonate) diethylene glycol; (meth)acrylic polymers and copolymers, particularly (meth)acrylic polymers and copolymers derived from bisphenol A; thio(meth)acrylic polymers and copolymers; urethane and thiourethane polymers and copolymers; epoxy polymers and copolymers; and episulphide polymers and copolymers.

The layer 17 incorporating the set of cells is preferably located on its front convex face 12, the back concave face 13 remaining free to be optionally shaped by machining and polishing if necessary. However, the layer 17 may also be located on the concave face of a lens. Obviously, the layer 17 may also be formed on a plane optical element.

The layer 17 incorporating the set of cells 15 may be covered by a number of additional layers 19, 20 (FIG. 3), according to standard practice in ophthalmic optics. These layers have functions, for example, of impact strength, scratch resistance, tinting, anti-reflective, anti-soiling, etc. In the example shown, the layer 17 is placed immediately above the transparent substrate 16, but it should be understood that one or more intermediate layers may be located between them.

Furthermore, it is possible for several sets of cells to be superimposed in the stack of layers formed on the substrate 16. It is thereby possible, for example, for the stack of layers to comprise in particular a layer of cells containing a substance which confers photochromic functions on the optical element, and another layer for conferring refractive index variation functions on the optical element. These cell layers may also be alternated with additional cells such as described above.

Figure 6:
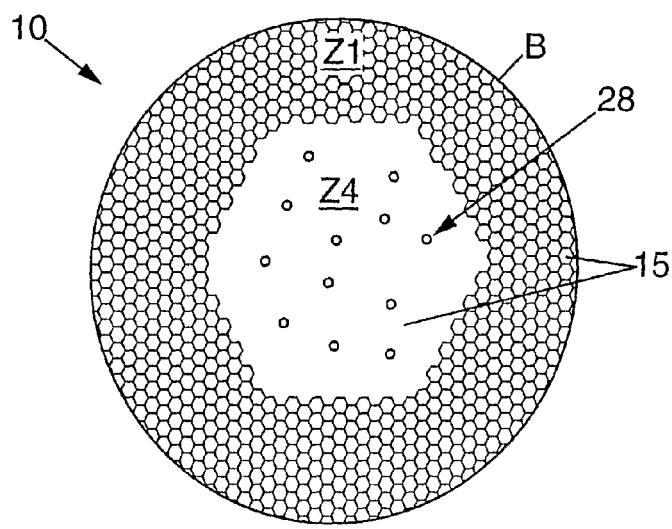
FIG. 6 shows a front view of an optical component according to a second embodiment of the invention.

According to a second embodiment of the invention shown in FIG. 6, the surface of the blank 10 is divided into two zones only: an outer zone Z1 in which the cells 15 are small sized, and a central zone Z4 comprising a single cell of the size of zone Z4.

Figure 7:
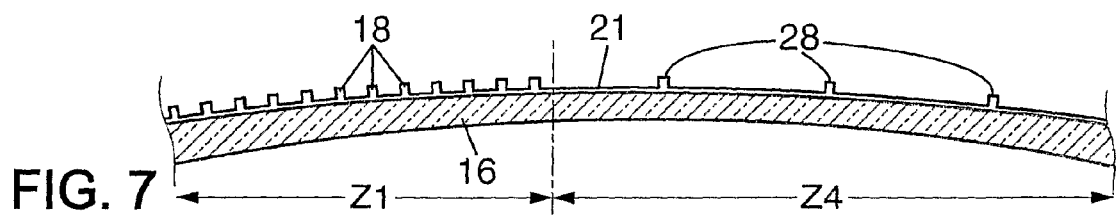
FIGS. 7 and 8 are schematic cross sections showing the optical component in FIG. 6 in two steps of its fabrication.
Figure 8:
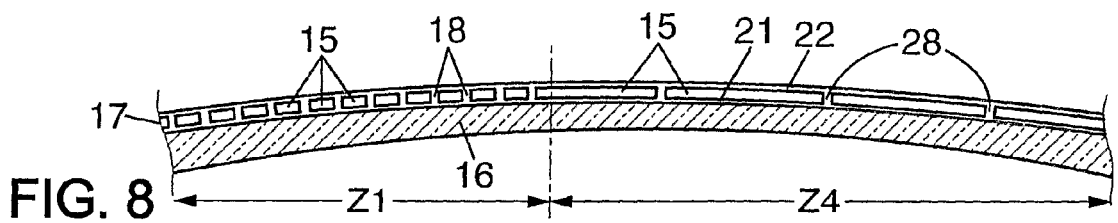

FIGS. 7 and 8 show a first manner for providing the set of cells 15 in FIG. 6 on the substrate 16. The technique here is similar to those used to fabricate electrophoretic display devices. These techniques are described, for example, in documents WO 00/77570, WO 02/01281, US 2002/0176963, U.S. Pat. No. 6,327,072 or U.S. Pat. No. 6,597,340. The set of cells 15 is also producible using fabrication methods derived from microelectronics, well known to a person skilled in the art. For illustration and in a non-limiting manner, mention can be made of processes such as hot printing, hot embossing, micromoulding, photolithography (hard, soft, positive, negative), microdeposition such as microcontact printing, screen printing, or ink jet printing.

In the example considered, a film of a solution of monomers polymerizable under the action of radiation, for example ultraviolet, is first deposited on the substrate 16. This film is subjected to ultraviolet radiation through a mask which conceals the squares or hexagons distributed in a network and corresponding to the positions of the cells 15. The selective polymerization leaves the supports placed above a base layer 21 in place. In FIGS. 7 and 8, the supports correspond to the walls 18 in the zone Z1, or are isolated spacers 28 in the zone Z4. The solution of monomers is then removed and the component 10 is in the state shown in FIG. 7.

To obtain a similar structure, another possibility is to use a photolithography technique. This begins by depositing a layer of material, for example polymer, on the substrate 16, in a thickness approximately equivalent to the height intended for the walls 18. A photoresist film is then deposited on this layer, and exposed through a mask with a grille pattern. The unexposed zones are removed during development of the photoresist to leave a mask aligned on the positions of the walls, through which the material layer is subjected to anisotropic etching. This etching, which forms the cells 15, is continued to the desired depth, after which the mask is removed by chemical etching.

From the state shown in FIG. 7, the cells 15 are filled with the optical-property substance in the liquid or gel state. A prior treatment of the front face of the component 10 may optionally be applied to facilitate the surface wetting of the material of the walls 18 and of the bottom of the cells 15. The solution or suspension forming the substance with an optical property may be the same for all the cells, in which case it can be introduced simply by immersing the component 10 in an appropriate bath, by a screen-printing type of process, by a spin-on process, by a process of spreading the substance using a roller or doctor blade, or by a spray process. It is also possible to inject it locally and individually into each cell using a material printing head. This latter method is typically used when the substance with an optical property is differentiated from one cell to another, several printing heads being moved along the surface of the component 10 to fill the cells in succession.

In the case in which the cells are formed by selective etching, another possibility is first to excavate a group of cells, to fill them collectively with a first substance and then to plug them, the remainder of the component surface remaining masked during these operations. The selective etching is then repeated through a resist mask covering at least the zones of the cells already filled in addition to the wall zones, and the new cells are filled with a different substance and then plugged. This process can be repeated at will to distribute different substances along the component surface.

To hermetically seal a set of filled cells, a plastic film 22 can be applied, for example, which can be glued, heat sealed or laminated to the top of the walls 18 and spacers 28. It is also possible to deposit, on the zone to be closed, a solution-polymerizable material, immiscible with the optical-property substance contained in the cells, and then polymerize this material, for example by heat or irradiation.

Once the set of cells 15 has been completed (FIG. 8), the component 10 can receive the additional layers or coatings 19, 20 to terminate its fabrication. Components of this type are fabricated in series and stored to be subsequently retrieved and cut out individually according to the needs of a client.

If the optical-property substance is not intended to remain in the liquid or gel state, a solidification treatment can be applied to it, for example, a heating and/or irradiation sequence, at an appropriate stage from the moment when the substance has been deposited.

Thus, the cells 15 are arranged between two transparent elements for retaining the optical-property substances. These elements consist respectively of the base layer 21 and the film 22. These retaining elements are parallel to the surface of the optical component 10, and the cells 15 are separated from one another by the walls 18 which connect the two retaining elements. The cells of the zone Z4 may each be provided with at least one spacer 28 which is in contact with the two retaining elements 21 and 22.

In this embodiment of the invention, the retaining elements 21 and 22 are common to several cells 15, without this being indispensable to implement the invention.

The spacers 28 are separate from the walls 18 of the corresponding cells and are preferably located at some distance therefrom. They may have a thickness of less than 5 μm, measured parallel to the component surface. In this way, the spacers 28 do not substantially modify the optical properties of the component 10, compared with the properties resulting from the substances contained in the cells 15. The spacers have a height of between 1 μm and 100 μm, and preferably between 1 μm and 10 μm, perpendicular to the surface of the blank 10. Advantageously, the spacers 28 have an identical height to the walls 18, making up the set of cells.

Optionally, the spacers 28 and/or the walls 18 may be made from an absorbing material. In the context of the invention, absorbing material means a material absorbing at least part of the visible spectrum, that is, having at least one wavelength absorption band between 400 nm and 700 nm. Advantageously according to the invention, materials having an absorption band over the entire visible spectrum are preferred. The materials used for making the walls may optionally comprise a spectral absorption band in the near infrared, that is above 700 nm, and/or in the near ultraviolet, that is below 400 nm.

The spacers 28 and the walls 18 may comprise respective portions of the same material. Alternately, the spacers 28 may be added-on elements arranged in the cells 15 of the zone Z4.

Figure 9:
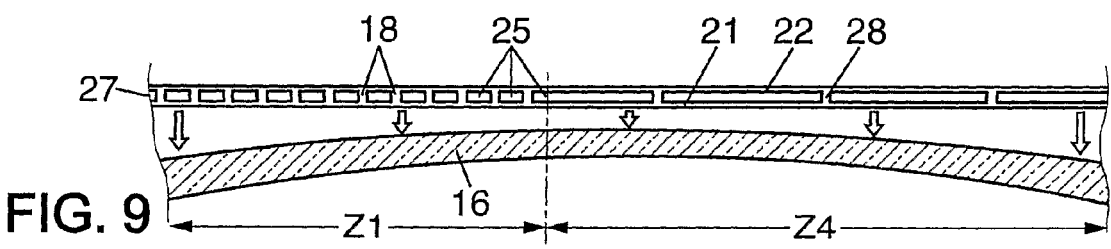
FIG. 9 is a schematic cross section showing another method of fabrication of the optical component in FIG. 6.

In a variant shown in FIG. 9, the optical component 10 which comprises a set of cells 25 is constructed in the form of a flexible transparent film 27. Such a film 27 can be made by techniques similar to those described above. In this case, the film 27 can be made on a plane support.

The film 27 comprises cells 25 located in its thickness, and filled with optical-property substances. The cells 25 are located between a lower part 21 and an upper part 22 of the film thickness. The parts 21 and 22 are connected by walls 18 which separate the neighbouring cells, and by spacers 28 arranged in the largest cells. The walls 18 and the spacers 28 are integrated in the film 27.

The film 27 is, for example, manufactured industrially on a relatively large scale, to realize economies in the grouped execution of the steps of the method, and then cut out to the appropriate dimensions to be transferred to the substrate 16 of a blank. This transfer can be achieved by bonding the flexible film, by thermoforming the film, or by physical adhesion under vacuum. The film 27 can then receive various coatings, as in the previous case, or be transferred to the substrate 16 itself coated with one or more additional layers as described above.

In one field of application of the invention, the optical property of the substance introduced into the cells 15 is related to its refractive index. The refractive index of the substance is adjusted along the surface of the component 10 to obtain a correction lens. In a first variant of the invention, the adjustment can be achieved by introducing substances with different refractive indices during the fabrication of the set of cells 15. For example, the substance contained in the cells 15 may be composed of liquids mixed in different proportions from one cell to another. In particular, the lens 11 thus obtained may be a progressive lens, if the substances contained in the cells are selected so that an optical power of the lens 11 varies along a meridian line thereof.

Based on a desired distribution of optical power and astigmatism in the surface of the blank 10, it is possible, in a known manner, to infer therefrom a distribution of the refractive index of the substances to be enclosed in the cells 15. To accurately obtain the desired optical power and astigmatism distribution, it may be advantageous to vary the size of the cells 15 according to the determined variations in the refractive index. For example, the cells 15 may be smaller, parallel to the surface of the substrate 16, at locations of the blank 10 where the refractive index must have a higher gradient, and they may be larger at locations of the blank 10 where the refractive index gradient is lower. A compromise may thus be reached, particularly, between the accuracy of obtaining the ametropy correction on the one hand, and an ease of filling of the cells 15 with appropriate substances at the places where the cells are larger, on the other.

In another variant of the invention, the adjustment can be achieved by introducing a substance into the cells 15, of which the refractive index can be adjusted subsequently under irradiation. The correcting optical function is then inscribed by exposing the blank 10 or the lens 11 to light of which the energy varies along the surface, to obtain the desired refractive index profile in order to correct the vision of a wearer. This light is typically the light produced by a laser, the writing unit being similar to the one used to burn CD-ROMs or other optical memory supports. The more or less long exposure of the photosensitive substance may result from an adjustment of the power of the laser and/or of the exposure time.

Among the substances usable in this application, mention can be made of mesoporous materials, liquid crystals and discotic components. For example, the liquid crystals can be fixed by a polymerization reaction, for example caused by irradiation. They can thus be fixed in a state selected to introduce a predefined optical delay in the light waves passing through them. In the case of a mesoporous material, the refractive index of the material can be controlled by varying its porosity. Another possibility is to use photopolymers, of which one well known property is to change the refractive index during the radiation-induced polymerization reaction. These changes in refractive index are due to a modification of the density of the material and to a change in its chemical structure. It is preferable to use photopolymers, which only undergo a very slight change in volume during the polymerization reaction.

In another application of the invention, the substance introduced in liquid or gel form into the cells has a photochromic property. Among the substances used in this application, mention can be made of photochromic compounds containing a central motif such as a spirooxazine, spiro(indoline-[2,3']-benzoxazine), chromene, homoazaadamantane spiroxazine, spiro(fluorene-(2H)-benzopyrane), naphtho[2,1-b] pyrane as described particularly in patent applications and patents FR 2763070, EP 0676401, EP 0489655, EP 0653428, EP 0407237, FR 2718447, U.S. Pat. No. 6,281,366 or EP 1204714.

The optical-property substance may also be a dye, or a pigment able to modify the light transmission rate. In the case of a light absorption property, it may be advantageous to vary this absorption parallel to the lens surface, and/or to make this absorption dependent on the polarization of light.

To produce optical lenses having a polarization optical property, the cells of the optical component may contain liquid crystals combined with dyes.

Among the other types of ophthalmic lenses to which the invention may apply, mention can also be made of active systems, in which a variation of one optical property results from an electrical stimulus. This is the case of electrochromic lenses, or lenses with adjustable refractive properties (see for example U.S. Pat. No. 5,359,444 or WO 03/077012). These techniques generally make use of liquid crystals or electrochemical systems.

The invention claimed is:

1. An optical component, comprising at least one transparent set of cells juxtaposed in parallel to a surface of the component in which the cells are microtanks separated from one another by cell-separating walls which extend perpendicular to the surface of the component, each individual microtank being hermetically sealed and containing an optical-property substance,
   wherein the set of cells comprises cells of several sizes, measured parallel to the component surface such that
   the set of cells includes at least one large cell in a central zone of the component surface, and small cells located in the component surface between said central zone and one edge of said surface, and
   the large cell has one dimension greater than 0.5 mm, and some of the small cells have one dimension smaller than 200 μm,
   wherein the one dimension of the at least one large cell and the one dimension of the small cells each correspond to an outer diameter of the cell.

2. Optical component according to claim 1, in which at least one cell has one dimension of between 0.5 mm and 5 mm, measured parallel to the component surface.

3. Optical component according to claim 1, in which some of the cells have one dimension smaller than 200 μm, measured parallel to the component surface.

4. Optical component according to claim 1, in which some of the cells have one dimension smaller than 100 μm, measured parallel to the component surface.

5. Optical component according to claim 1, in which the size of the cells varies in a continuous size gradient between the central zone of the surface of the optical component and the edge of said surface.

6. Optical component according to claim 1, in which the size of the cells varies in a discontinuous size gradient between the central zone of the surface of the optical component and the edge of said surface.

7. Optical component according to claim 1, in which the size of the cells varies according to a combination of continuous and discontinuous size gradients between the central zone of the surface of the optical component and the edge of said surface.

8. Optical component according to claim 1, in which the optical-property substance contained in at least some of the cells is in liquid or gel form.

9. Optical component according to claim 1, in which the optical property is selected from a property of tinting, photochromism, polarization, and refractive index.

10. Optical component according to claim 1, in which the substance contained in the cells is configured to modify light absorption through the cell so that the amount of light absorption varies with respect to a position of the cell along a direction parallel to the component surface.

11. Optical component according to claim 1, wherein the small cells are non-concentric with the at least one large cell.

12. Optical component according to claim 1, in which at least some of the cells contain substances having respective optical refractive indices which differ between said cells.

13. Optical component according to claim 12, in which some of the cells containing substances of different refractive indices have variable dimensions.

14. Optical component according to claim 13, in which the dimensions of the cells containing substances of different refractive indices are adapted according to the estimated ametropy of an eye to be corrected.

15. Optical component according to claim 1, in which at least one cell of the set is arranged between two transparent elements for retaining the optical-property substance in said cell, said two transparent elements being parallel to the surface of the optical component, the cell being separated from other cells of the set by walls connecting the two transparent elements, and in which the cell is provided with at least one spacer in contact with the two transparent elements, said spacer being separate from the walls separating the cell from other cells of the set.

16. Optical component according to claim 15, in which the two transparent elements are common to several cells of the set.

17. Optical component according to claim 15, in which the spacer is located at a distance from the walls separating the cell from the other cells of the set.

18. Optical component according to claim 15, in which the spacer has a thickness lower than 5 μm, measured parallel to the component surface.

19. Optical component according to claim 15, in which at least one of the spacer and the walls comprise an absorbing material.

20. Optical component according to claim 15, in which the spacer and the walls separating the cell comprise respective portions of the same material.

21. Optical component according to claim 15, in which the spacer is an added-on element arranged in the cell.

22. A transparent optical element selected from ophthalmic lenses, contact lenses, ocular implants, lenses for optical instruments, filters, optical sighting lenses, ocular visors, and optics of lighting devices that is fabricated from an optical component according to any one of the preceding claims.

23. Spectacle lens, made by cutting out an optical component according to claim 22.

24. Spectacle lens according to claim 23, in which the substance contained in the cells is a photochromic substance.

25. Spectacle lens according to claim 23, in which at least one hole is drilled through the component to fasten the spectacle lens to a frame.

26. Spectacle lens according to claim 23, in which the optical property of the substances contained in some of the cells and the dimensions of said cells are adapted to vary along the lens surface according to the estimated ametropy of an eye to be corrected.

27. Spectacle lens according to claim 26, of the progressive lens type.

28. Optical component, comprising
   at least one transparent set of cells juxtaposed in parallel to a surface of the component in which the cells are separated from one another by cell-separating walls which extend perpendicular to the surface,
   each individual cell being hermetically sealed and containing an optical-property substance, wherein the set of cells comprises cells of several sizes, measured parallel to the component surface, the set of cells includes at least one large cell in a central zone of the component surface, and small cells located in the component surface between said central zone and a peripheral edge of said surface, the cells being arranged such that when the optical component is sectioned along a first annular line that bounds the central zone that is co-centric with the optical component and disposed between a center of the optical component and the peripheral edge of the optical component, no cell walls are intercepted, and along a second annular line that bounds a second zone that is co-centric with the optical component, is disposed between the first annular line and the peripheral edge of the optical component, and is spaced apart from the first annular line, more than one cell wall is intercepted.

* * * * *